(12) United States Patent
Tse et al.

(10) Patent No.: US 11,731,724 B2
(45) Date of Patent: Aug. 22, 2023

(54) ENCLOSURE ASSEMBLY FOR VEHICLE, METHOD OF MOUNTING, AND VEHICLE INCLUDING THE ENCLOSURE ASSEMBLY

(71) Applicant: GRABTAXI HOLDINGS PTE. LTD., Singapore (SG)

(72) Inventors: Yat Ming Tse, Kowloon (HK); Shi Qian Wang, Guangdong (CN); Chee Koon Lim, Singapore (SG); Guo Dong Song, Guangdong (CN)

(73) Assignee: GRABTAXI HOLDINGS PTE. LTD., Singapore (SG)

( * ) Notice: Subject to any disclaimer, the term of this patent is extended or adjusted under 35 U.S.C. 154(b) by 0 days.

(21) Appl. No.: 17/610,998

(22) PCT Filed: Jul. 9, 2020

(86) PCT No.: PCT/SG2020/050395
§ 371 (c)(1),
(2) Date: Nov. 12, 2021

(87) PCT Pub. No.: WO2021/054893
PCT Pub. Date: Mar. 25, 2021

(65) Prior Publication Data
US 2022/0242516 A1    Aug. 4, 2022

(30) Foreign Application Priority Data
Sep. 20, 2019    (CN) .......................... 201910893472.7

(51) Int. Cl.
*B62K 3/00*    (2006.01)
*B62J 6/028*    (2020.01)

(52) U.S. Cl.
CPC ............... *B62K 3/002* (2013.01); *B62J 6/028* (2020.02)

(58) Field of Classification Search
CPC ............ B62K 3/002; B62J 6/028; B62J 99/00
See application file for complete search history.

(56) References Cited

U.S. PATENT DOCUMENTS

| | | | |
|---|---|---|---|
| 8,857,347 B1 * | 10/2014 | Liu | A47B 5/02 108/47 |
| 2006/0186158 A1 | 8/2006 | Ishikawa | |

(Continued)

FOREIGN PATENT DOCUMENTS

| | | |
|---|---|---|
| CN | 204021177 | 12/2014 |
| CN | 204279741 | 4/2015 |

(Continued)

OTHER PUBLICATIONS

International Search Report (Application No. PCT/SG2020/050395) dated Nov. 2, 2020.

(Continued)

*Primary Examiner* — Daryl C Pope
(74) *Attorney, Agent, or Firm* — Buckley, Maschoff & Talwalkar LLC (57) ABSTRACT

Aspects concern an enclosure assembly for mounting on a tube of a vehicle, methods of mounting the assembly on a vehicle, and a vehicle including the assembly. The assembly comprises a clamping portion comprising a concave portion for at least partially surrounding the tube and a flange portion at one end of the concave portion; a holding support plate including a first side for facing the tube and a second side opposite thereto, the first side configured to be attached to the flange portion by a fastening means solely operable from the second side of the holding support plate at a position of operability; a housing comprising a cavity for receiving an electronic circuit and a lower portion to be attached to the second side of the holding support plate. The housing overlaps said position of operability.

20 Claims, 4 Drawing Sheets

(56) References Cited

U.S. PATENT DOCUMENTS

| | | | |
|---|---|---|---|
| 2010/0052907 A1 | 3/2010 | Shannon et al. | |
| 2010/0314514 A1* | 12/2010 | Nelson | F16M 11/2021 |
| | | | 248/218.4 |
| 2019/0058982 A1 | 2/2019 | Lee | |

FOREIGN PATENT DOCUMENTS

| | | |
|---|---|---|
| CN | 205469631 | 8/2016 |
| CN | 108407937 | 8/2018 |
| CN | 207826439 | 9/2018 |
| CN | 208881986 | 5/2019 |
| CN | 208931502 U | 6/2019 |
| CN | 209382163 U | 9/2019 |
| JP | 2005-145203 | 6/2005 |
| WO | WO-2017/217936 A1 | 12/2017 |
| WO | WO-2019/026046 A1 | 2/2019 |

OTHER PUBLICATIONS

Written Opinion (Application No. PCT/SG2020/050395) dated Nov. 2, 2020.
International Preliminary Report on Patentability (Application No. PCT/SG2020/050395) dated Jul. 16, 2021 (11 pgs).
Chinese Office Action for Application No. 201910893472.7 dated Jan. 13, 2023.

* cited by examiner

FIG. 7

ENCLOSURE ASSEMBLY FOR VEHICLE, METHOD OF MOUNTING, AND VEHICLE INCLUDING THE ENCLOSURE ASSEMBLY

TECHNICAL FIELD

Various aspects of this disclosure relate to an enclosure assembly for mounting on a tube of a vehicle, to methods of mounting the enclosure assembly on a vehicle, and to a vehicle including the enclosure assembly.

BACKGROUND

Vehicles, such as an electric scooter, may include an electric circuit for controlling the power of the scooter. When these vehicles are used for sharing, they may include a communication circuit which indicates the status of the vehicle, for example, to the sharing central. Such communication circuits may be included in a box which is mounted on a tube of a frame of the vehicle, by screws. For mounting the box on the tube, the screw is inserted and tightened. However, since the screw is exposed, it is subject to vandalism, and the box may be removed without authorization. Therefore, there is a need to solve above mentioned problem.

SUMMARY

Various embodiments concern an enclosure assembly for mounting on a tube of a vehicle.

According to various embodiments, the enclosure assembly may include a clamping portion and a holding portion. The clamping portion may include a concave portion for at least partially surrounding the tube and a flange portion at one end of the concave portion. The holding support plate includes a first side for facing the tube and a second side opposite thereto. The first side may be configured to be attached to the flange portion of the clamping portion by a fastening means. The fastening means may be solely operable from the second side of the holding support plate at a position of operability. The holding support plate and the clamping portion may surround and clamp the tube, e.g., thereby restricting movement of the enclosure assembly in relation to the tube, when mounted on the tube. The enclosure assembly may further include a housing for receiving an electronic circuit. The housing may include a housing lower portion configured to be attached to the second side of the holding support plate. The housing may overlap said position of operability.

According to various embodiments, the fastening means may be releasable.

According to various embodiments, the housing and/or the holding support plate may include an interlocking connection member configured to interlock the holding support plate with the housing.

According to various embodiments, the interlocking connection member may be covered by the housing, when the housing is attached to the holding support plate.

According to various embodiments, the interlocking connection member may be releasable.

According to various embodiments, the housing and/or the holding support plate are configured to be attached to each other by a securing means solely operable at a securing position arranged on an outer surface of the housing. According to various embodiments, the securing means may be releasable.

According to various embodiments, the housing may include an attachable panel, configured to overlap the securing means when the securing means is in the securing position.

According to various embodiments, the housing may include a housing cover. The housing lower portion may include a housing base. The housing cover and the housing base may be attachable to each other for closing the cavity.

According to various embodiments, the holding support plate may include a cable passage extending through the holding support plate from the first side to the second side.

According to various embodiments, the enclosure assembly may further include an electronic circuit housed in the cavity of the housing.

According to various embodiments, the attachable panel may include at least one light transmitting portion which may be at least partially transparent or translucent such that light from a light emitting diode of the electronic circuit may be visible from an outside of the housing.

According to various embodiments, the holding support plate may further include a sound transmission portion to letting pass acoustic waves through the holding support plate from the second side to the first side. According to various embodiments, the method may include arranging the clamping portion and the holding support plate along a circumference of the tube. The method may further include attaching the clamping portion with its flange portion to the holding support plate with the fastening means, wherein the clamping portion and the holding support plate together at least partially surround the circumference of the tube. The method may further include attaching the housing to the second side of the holding support plate, wherein the housing overlaps the position of operability.

Various embodiments concern a vehicle including a tube and an enclosure assembly according to various embodiments, wherein the enclosure assembly is mounted on a tube of the vehicle.

According to various embodiments, the vehicle may be an electric scooter.

BRIEF DESCRIPTION OF THE DRAWINGS

The invention will be better understood with reference to the detailed description when considered in conjunction with the non-limiting examples and the accompanying drawings, in which.

DETAILED DESCRIPTION

The following detailed description refers to the accompanying drawings that show, by way of illustration, specific details and embodiments in which the disclosure may be practiced. These embodiments are described in sufficient detail to enable those skilled in the art to practice the disclosure. Other embodiments may be utilized and structural, and logical changes may be made without departing from the scope of the disclosure. The various embodiments are not necessarily mutually exclusive, as some embodiments can be combined with one or more other embodiments to form new embodiments.

Embodiments described in the context of one of the enclosure assemblies, vehicles, or methods are analogously valid for the other enclosure assemblies, vehicles, or methods. Similarly, embodiments described in the context of an enclosure assembly are analogously valid for a vehicle or a method, and vice-versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

The word "tube" used herein and in accordance with various embodiments may refer to a tubular profile. The tube may be essentially rigid so that it can be used as part of a vehicle's structure. In one example, the tube may be an elongated material having a homogenous cross-section along its length. In examples, a cross-section of the tube may be a polygon, an oval or a circle, or a mixture of parts thereof, for example the tube may be a circular pipe.

In the context of various embodiments, the articles "a", "an" and "the" as used with regard to a feature or element include a reference to one or more of the features or elements.

As used herein, the term "and/or" includes any and all combinations of one or more of the associated listed items.

Figure 1:
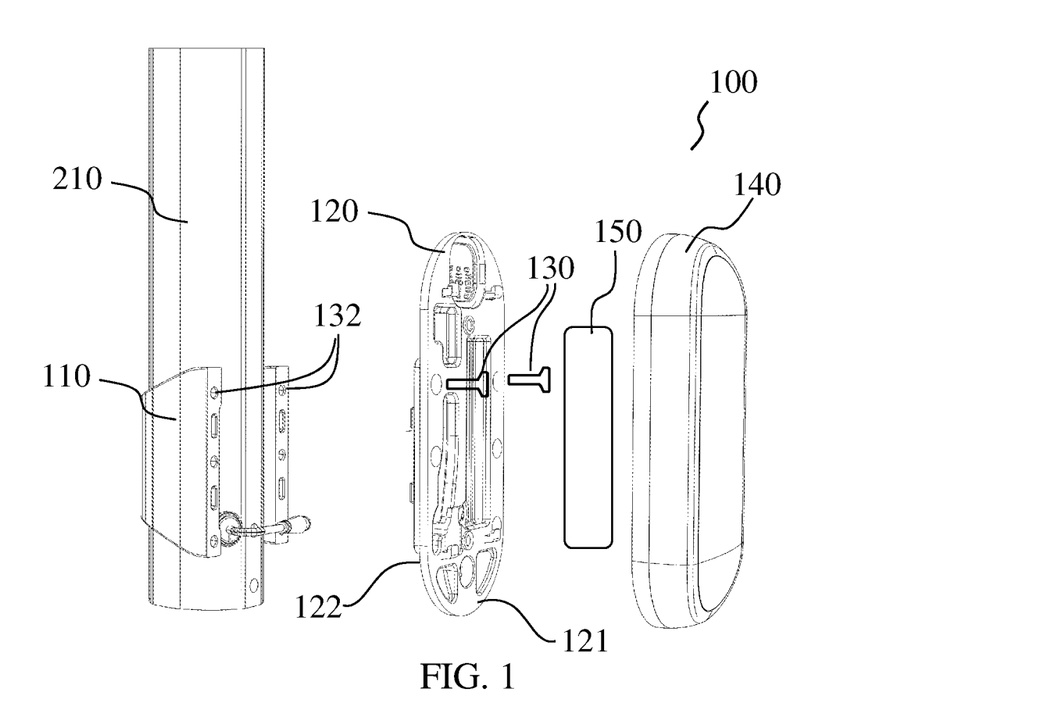
FIG. 1 shows an exploded view of an enclosure assembly 100 on a tube 210 in accordance with various embodiments.

FIG. 1 shows an exploded view of an exemplary enclosure assembly 100 on a tube 210 in accordance with various embodiments. The enclosure assembly 100 is configured to be mounted on a tube 210 of a vehicle. The enclosure assembly 100 may include a clamping portion 110 including a concave portion for at least partially surrounding the tube 210 along its circumference in a mounted configuration. For example, the clamping portion 110 may have a U-shaped cross-section or an L-shaped cross-section.

Figures 2A, 2B:
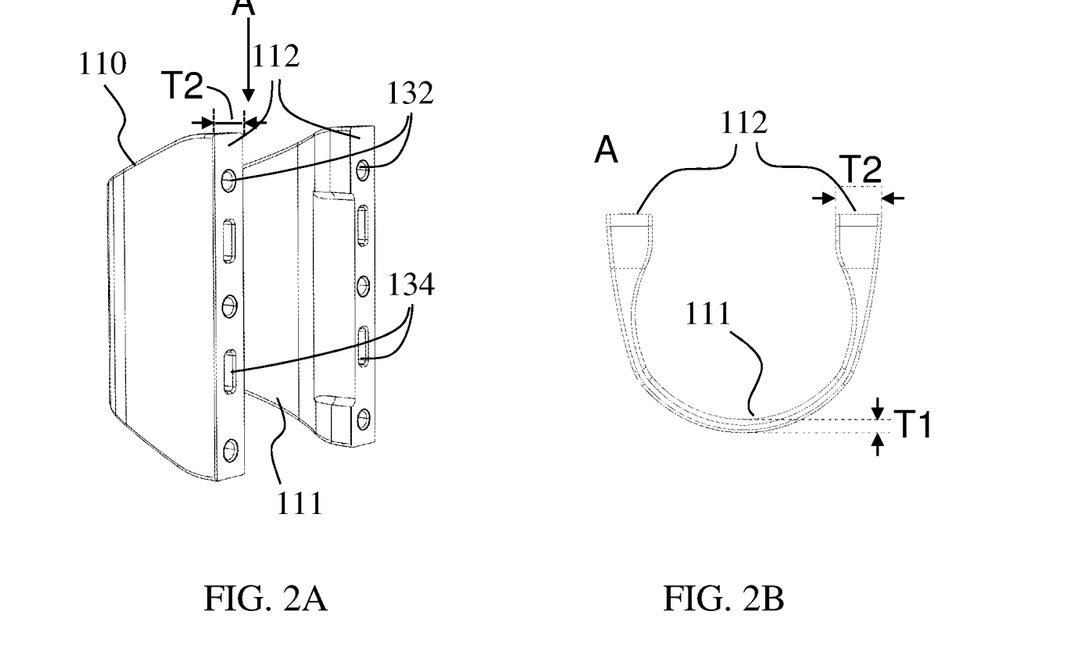
FIGS. 2A and 2B show a clamping portion 110 of the enclosure assembly in accordance with various embodiments.

FIGS. 1, 2A and 2B show an exemplary clamping portion 110 in accordance with various embodiments. FIG. 2B is the view from position A of FIG. 2A. The clamping portion 110 may include a concave portion for receiving the tube 210, for example the concave portion may be a circular section for receiving a circular tube having a diameter. The clamping portion as used herein and according to various embodiments, may also be named as mounting ring, which also is intended to a partial section of a ring having a round and/or angular cross-section. Clamping portions of different sizes and/or different concavity shapes may be used for different tubes. The enclosure assembly 100 may further include a holding support plate 120 configured to be attached to the clamping portion 110 (via flange) by fastening means 130. The holding support plate 120 is configured to receive an underside of the housing 140. As shown in the figures by way of example, the clamping portion 110 includes a flange portion 112 at one end of the concave portion 111. The holding support plate 120 may include a first side for facing the tube and a second side opposite thereto, the first side may be configured to be attached to the flange portion 112 of the clamping portion 110 by a fastening means 130 solely operable from the second side of the holding support plate 120 at a position of operability. Thus, when the holding support plate 120 is attached to the clamping portion 110, the first side of the holding support plate 120 may be attached to the flange portion 112. The holding support plate 120 and the clamping portion 110 are configured to surround the tube 210, e.g., the clamping portion 110 pressing against the tube thereby restricting movement of the enclosure assembly 100 in relation to the tube 210, when mounted on the tube 210. The clamping portion 110 may include an element 132 in the flange to cooperate with the fastening means 130. According to various embodiments, the holding support plate may include or be a metal plate. In some embodiments, a material thickness of the clamping portion 110 may be different on different parts, for example, the part that contacts the tube, such as at least a part of the concave portion 111, may have a first thickness T1, and the part terminating in flange portion 112 may have a thickness T2. Thicknesses T1 may be measured in a direction facing away from the tube. The thickness T2 may be the lateral dimension of the surface (one side) of the flange portion 112, for example a smaller lateral dimension is not parallel to a tube axis. The thickness T2 may be larger than the thickness T1. In examples, T1 may be chosen between 2 mm and 5 mm and T2 may be chosen between 6 mm and 20 mm. A second thickness T2 larger than the first thickness may provide a support for the holding support plate 120 while saving material for the thinner concave portion 111.

According to various embodiments, the fastening means 130 may be one or more screws and the element 132 may be configured to cooperate with the fastening means 130, for example, element 132 be one or more screw holes for receiving the respective one or more screws. The screw holes may include an inner thread. The element 132 may be provided on the surface(s) of the flange portion 112. FIG. 1 shows, for illustration purposes, 6 holes 132 on the flange portions 112, each side having 3 holes. Other elements, such as alignment elements and/or structural reinforcement elements may be added to enhance the attachment between the clamping portion 110 and the holding support plate 120. See for example slots 134 on the clamping portion 110, and respective protrusions on the holding support plate 120 (see FIG. 1). Thus, in the example of FIG. 1 the fastening means 130 may include 6 screws.

According to various embodiments, the enclosure assembly 100 may further include a housing 140 for receiving an electronic circuit 150. A housing lower portion may be configured to be attached to the second side of the holding support plate 120. The housing 140 overlaps the position of operability. When attached to the holding support plate 120, the housing 140 may cover at least the second side 121 of the holding support plate 120. The second side is illustrated as the surface 121 of the holding support plate 120 which faces away from the tube 210. The first side 122, which is opposite the second side, faces the tube 210.

Due to the use of the holding support plate 120, a same housing type may be attached onto tubes of different sizes. The housing 140 and the holding support plate 120 may be configured to be attached to each other by a securing means 160 solely operable at a securing position arranged on an outer surface of the housing 140. Details of the securing means will be explained further below, for example in connection with FIGS. 5 and 6. The housing 140 and/or the holding support plate 120 may include an interlocking connection member (124, 144) configured to interlock the holding support plate 120 with the housing 140. The interlocking connection member (124, 144) may be covered by the housing 140, when the housing 140 is attached to the holding support plate 120. The interlocking connection member (124, 144) may be releasable, meaning that the housing 140 may be detached from the holding support plate 120, provided that the securing means 160 are released. The housing may include plastic components, for example it may be made of plastics.

According to various embodiments, the housing 140 including the electronic circuit 150 may be devised as an internet of things (IoT) box, for example providing communication between the vehicle and the internet. For example sensor data from the electronic circuit 150 may be transmitted over wireless transmission, such as the data mobile phone network, to a remote server, via the internet.

According to various embodiments, in the mounted position, the fastening means 130 is inaccessible when the housing 140 is attached to the holding support plate 120, for example when the holding support plate 120 is attached to the clamping portion 110 and the housing 140 is attached to the holding support plate 120. Further, the fastening means 130 is accessible when the cover of the housing 140 is unattached, for example for fastening or releasing. Such releasing of the holding support plate 120 and/or the clamping portion 110 from the tube may be desired, for example, for maintenance. Thus, in some embodiments, the fastening means 130 may be a releasable fastening means, such as a screw including a bearing surface for screwing removing tools, such as an screw with a head, for example an Allen bolt.

Figure 3:
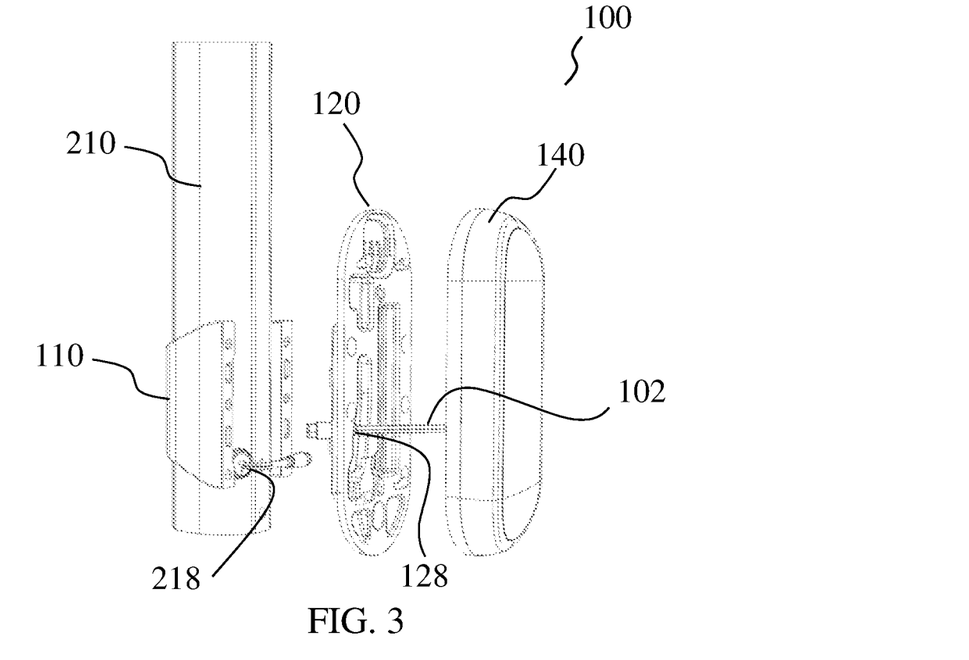
FIG. 3 shows an exploded view of an enclosure assembly 100 on a tube 210, a cable for passing from the housing 140 into the cable passage 128, in accordance with various embodiments.

FIG. 3 shows, in an exploded view of the enclosure assembly 100 on a tube 210, a cable 102 for passing from the housing 140 and through a cable passage 128 of the holding support plate 120, in accordance with various embodiments. The cable may be an electrical cable and may transmit power and/or provide a communication line. Thus, the holding support plate 120 may include a cable passage 128 for allowing a cable to pass from one side 121 (i.e. the first side) of the holding support plate 120 to the other side 122 (i.e. the second side) of the holding support plate 120. The tube may include a respective cable extension for connecting to the cable 102, for example, the cable extension may be exiting from a side hole of the tube 210. The position of the enclosure assembly 100 may be aligned to the position 218 where the cable extension exits the tube 210, for allowing the connection between cable and cable extension. Other alternative electrical connection means are envisaged. For example, alternatively to the cable extension, an electrical connector may be embedded in the tube's 210 surface.

Figure 4:
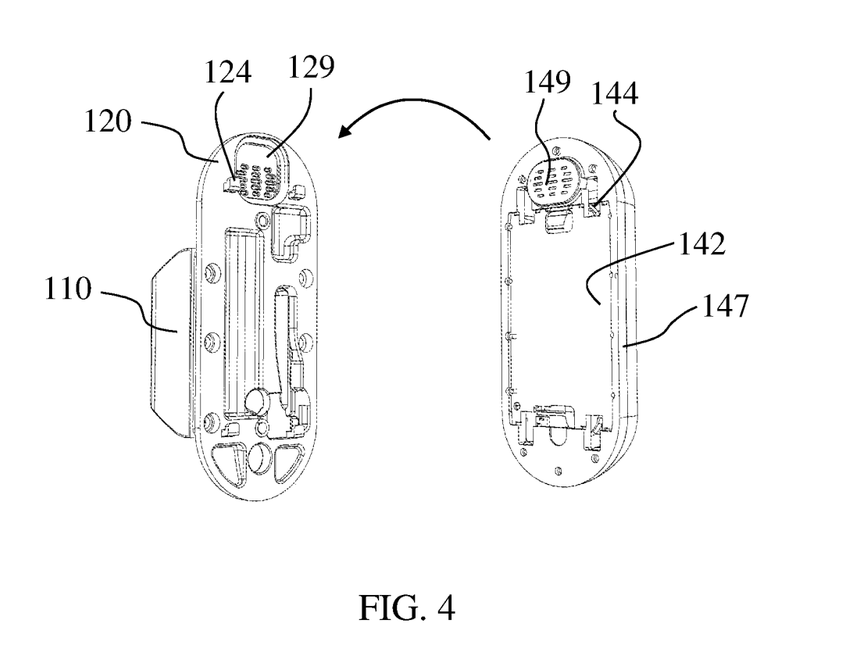
FIG. 4 shows on the left side, a holding support plate 120 attached to the clamping portion 110 wherein the holding support plate 120 is configured to receive an underside of a housing, for example, a housing base 142 (right side of the figure), in accordance with various embodiments.

FIG. 4 shows on the left side, a holding support plate 120 attached to the clamping portion 110. The holding support plate 120 is configured to receive an underside of the housing 140. In some embodiments, the housing 140 may include a housing base 142, such as the one shown on the right side of FIG. 4, for illustration purposes. According to various embodiments, the holding support plate 120 may further include a sound transmission portion 129 for letting pass sound to surrounding air at an outer side of the enclosure assembly 100, for example in direction to the tube 210, to the air in an air gap between tube 210 and holding support plate 120. Examples of the sound transmission portion 129 are: an opening, a membrane. The enclosure assembly may be configured such that, when mounted on the tube 210, an air gap exists between the holding support plate 120 and the tube 210 allowing sound to pass to the environment. According to various embodiments, the sound transmission portion 129 may be at least partially overlapping with a further sound transmission portion 149 arranged in the housing base 142, when the housing 140 is attached to the holding support plate 120. The further sound transmission portion 149 may be implemented as a membrane.

According to various embodiments, the housing 140 may be attachable to the holding support plate 120 by an attachment means. The housing 140 and the holding support plate 120 may be configured such that the attachment means are externally non-visible when the housing 140 is attached to the holding support plate 120. For example, the housing 140 may cover the surface 121 of the second side of the holding support plate 120 which faces away from the tube 210 thereby hiding at least a portion of the fastening means 130.

The enclosure assembly 100 may include an interlocking connection configured to interlock the holding support plate 120 with the housing 140 in accordance with various embodiments. For example, the interlocking connection may include hooks 124 and respective recesses 144 configured to receive the hooks 124. The hooks 124 may be implemented in the housing 140 and the recesses 144 may be implemented in the holding support plate 120, or vice-versa.

Figure 5:
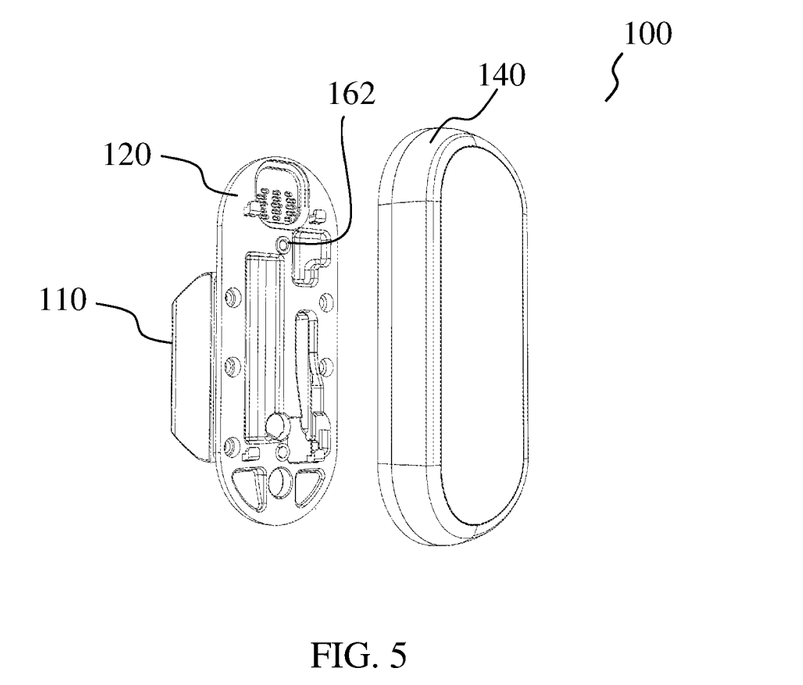
FIG. 5 shows a holding support plate 120 attached to the clamping portion 110 and a housing 140 not attached to the holding support plate 120, in accordance with various embodiments.
Figure 6:
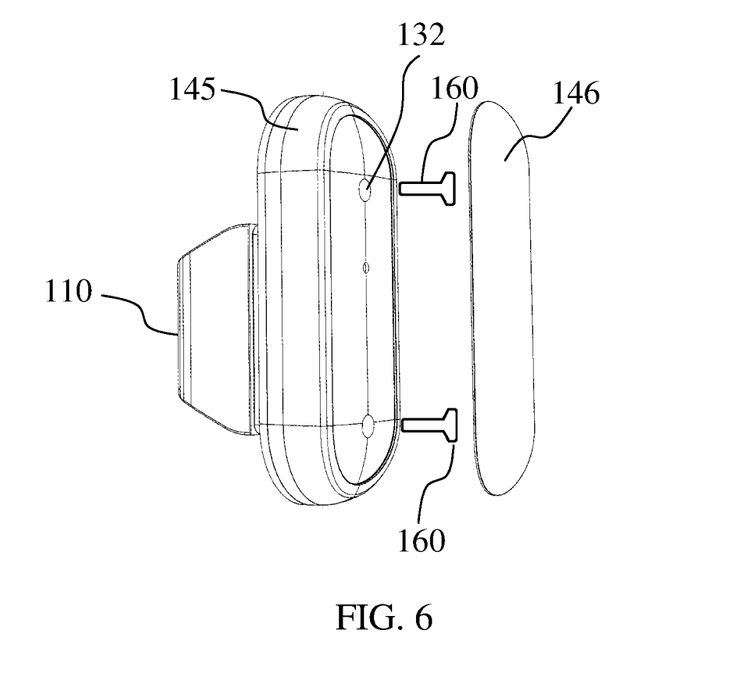
FIG. 6 shows a holding support plate 120, a clamping portion 110, and a housing 140 in a mounted position, and further shows securing means 160 and an attachable panel 146, in accordance with various embodiments.

More details of the housing are explained in connection with FIGS. 5 and 6. Turning to FIG. 5, it shows a holding support plate 120 attached to the clamping portion 110 and a housing 140 not attached to the holding support plate 120, in accordance with various embodiments. FIG. 6 shows a holding support plate 120, a clamping portion 110, and a housing 140 in the mounted position (the tube is not shown), and further shows securing means 160 and an attachable panel 146, in accordance with various embodiments.

Turning to FIG. 6, the securing means are explained in more details as follows. The securing means 160 may be provided alternatively or in addition to the interlocking connection members. The securing means 160 may cooperate with elements 162 to secure the housing 140 to the holding support plate 120. A receptacle 132 may be provided in the housing cover 145 for allowing through-insertion of the securing means from a top of the housing cover 145 (e.g., side facing away from the tube 210) to the elements 162. When the housing cover 145 is coupled (e.g. interlocked) to the holding support plate 120, receptacles 132 are aligned with elements 162, respectively. The housing cover 145 and the holding support plate 120 are configured accordingly. As illustrated in the FIGS. 5 and 6 by way of example, the securing means 160 may include one or more screws (for example two screws), which may be inserted into respective receptacles 132 and screwed onto respective one or more screw holes 162. The securing means 160 may be releasable, therefore enabling the housing 140 to be removed for maintenance.

According to various embodiments, the housing 140 may include a housing cover 145 and an attachable panel 146, configured to be attached to the housing cover 145. The attachable panel 146 may be attachable to a side of the housing 140 opposite to the side facing of the tube. The housing 140 and/or the attachable panel 146 may include recess or protrusions to allow the housing 140 and the attachable panel 146 to be attached to each other. The attachable panel 146 may be made of plastics. The attachable panel 146 may be configured to overlap the securing means 160 when the securing means 160 are in the securing position, for example, the attachable panel 146 may cover an access to the securing means 160.

When the securing means 160 are provided in accordance with various embodiments the securing means 160 may be externally non-visible when the housing 140 is attached to the holding support plate 120 and the attachable panel 146 is attached to the housing cover 145. This provides for additional anti-theft protection since a person trying to remove the housing from the vehicle would not see the securing means 160 and therefore not know how the housing is attached to the holding support plate 120. Further protection is provided, since a person trying to remove the clamping portion 110 and the holding support plate 120 from the tube would not see the fastening means and therefore not know how the clamping portion 110 and the holding support plate 120 are attached to the tube.

According to some embodiments, the housing 140 may include a housing cover 145 and a housing base 142. The housing cover 145 and the housing base 142 may cooperate with each other, so that they are attachable to each other, closing the cavity, for example, forming a hermetical seal. Thus, an inner cavity of the housing 140 may be isolated from external influences when the housing cover 145 is attached to the housing base 142. In this configuration, an electronic circuit 150 may be isolated and therefore protected from possible damages when handling the housing 140 when it is attached to the holding support plate 120.

A process (or method) for assembling the housing 140, for example including attaching the housing base 142 to the housing cover 145, may be separated from a process of attaching the housing 140 onto the vehicle. These two processes may be carried out at different times and in physically separate locations. A person assembling the housing 140 can focus on the process and quality requirements for assembling the housing 140, for example, providing the hermetical seal. If, for example, another person attaches the housing 140 onto the vehicle, he does not need to concern about details of the housing 140, since the housing 140 is easily attachable to the holding support plate 120. Therefore, there is less risk that a hermetical seal may be defective after the enclosure assembly is mounted on the tube.

According to various embodiments, the enclosure assembly 100 may include an electronic circuit 150 in the housing 140. To keep the electronic circuit 150 isolated from external influences, for example from water, moisture, dirt, and/or pollutants, the electronic circuit 150 is disposed in an inner cavity of the housing 140. The housing may conform to IP65 of the International Protection Marking, IEC standard 60529. The further sound transmission portion 149, for example, on a wall of the housing 140 (e.g. on the housing base 142), does not break the seal, since it could be provided by a membrane, for example a membrane that allows transmission of sound but is impermeable to moisture. Further, a cable 102 passing through a wall of the housing 140, for example through the housing base 142, does not break the seal, since the cable passage 128 may be tightly closed on the cable, for example by using a waterproof glue.

According to various embodiments, the housing 140 may include a light transmitting portion which is at least partially transparent or translucent such that light emitted from a light emitting diode (LED) of the electronic circuit 150 is visible from an outside of the housing. For example the housing cover 145 may include a hole for inserting an LED and/or an optical window, for example a portion of a wall of the housing 140 may be thin enough so that light from the LED is visible through the portion, when the LED emits light. In some embodiments the housing cover may overlap with the LED, in such embodiments, the attachable panel 146 may include at least one further light transmitting portion which may be at least partially transparent or translucent such that light from an LED of the electronic circuit 150 may be visible from an outside of the housing 140. In one example, the light may be flashing as an indication of status of the electronic circuit 150.

Figure 7:
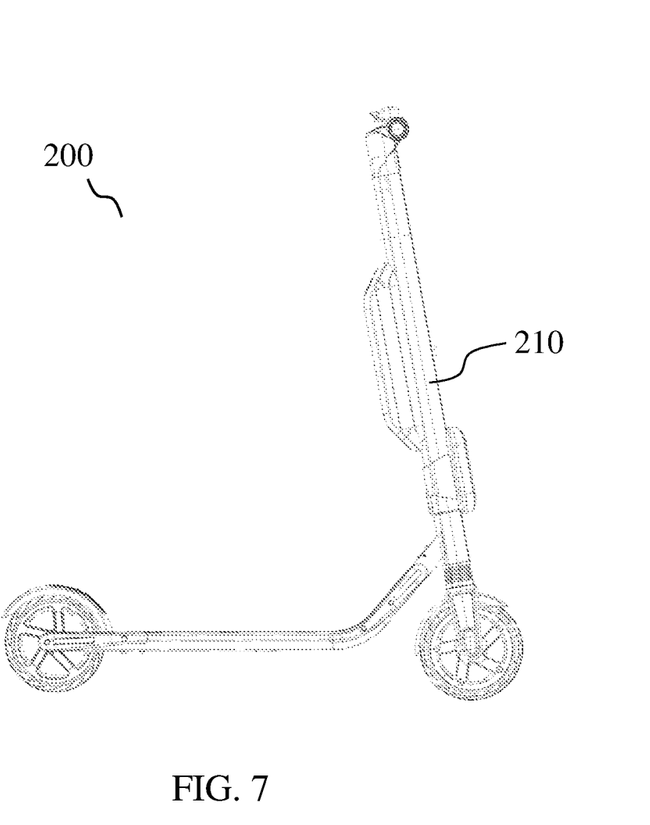
FIG. 7 shows an electric scooter including the enclosure assembly 100 in accordance with various embodiments.

FIG. 7 shows an exemplary electric scooter including the enclosure assembly 100 in accordance with various embodiments. Mounting the enclosure assembly 100 on the electric scooter, for example, on the front of the tube 210 in driving direction of an electric scooter, may provide improved wireless communication and a high level of protection for the electronic circuit 150. The fastening means 130 are hidden within the enclosure assembly 100 providing an anti-theft enclosure assembly 100, since enclosure assembly components and screws are designed to prevent illegal disassembly. Further, to improve the anti-theft characteristic, specially designed screws may be employed, for example having non-standard screw heads. While anti-theft and robustness of the mounting is provided, the housing 140 may be efficiently removed, for enabling inspection and maintenance. For example, an existing housing 140 with the electronic circuit 150 may be replaced and sent to the factory or warehouse for maintenance. Thus, the herein presented aspects of the disclosure may be used for sharing vehicles, wherein a customer rents the vehicle, for example by time, and returns the vehicle to a predetermined location or leaves the vehicle at any suitable place (e.g. on a parking stand) after the rental period is over, thus leaving the vehicle unattended by any person nearby.

According to various embodiments, a method of mounting an enclosure assembly 100 on a tube 210 of a vehicle 200 may be provided. The method may include arranging the clamping portion 110 and the holding support plate 120 along a circumference of the tube 210. The method may further include attaching the clamping portion 110 with its flange portion 112 to the holding support plate 120 by the fastening means 130, the clamping portion 110 and the holding support plate 120 together at least partially surrounding the circumference of the tube. The method may further include attaching the housing 140 to the second side of the holding support plate 120, wherein the housing 140 overlaps the position of operability. Further, the method may include operating the securing means into the securing position. In the securing position the housing 140 and the holding support plate 120 are attached to each other. Operating the securing means may include inserting and/or engaging the securing means, for example screwing-in screws. Further, the method may include attaching the panel 146 to overlap the securing means 160 when the securing means 160 are in the securing position.

With an enclosure assembly in accordance with various embodiments, one type of housing may be assembled on different tubes, such as different vehicles, for example on electric scooters of different models. For example the housing and the holding support plate may be of a same type and only the clamping portion needs to be different and adapted for each type of tube. In another example, the clamping portion and the holding support plate may be different for each type of tube, and the different holding support plates may each be configured to be attached (i.e. to receive) the same housing. Thus, compatibility of a same housing with different types of vehicles may be ensured. Due to the modular design, mistakes from manually installation would not affect the vehicle's tube. Therefore, a product life of the vehicle may be extended in comparison to conventional mounts which are screwed onto the tube providing a high level of reliability.

While the disclosure has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. An enclosure assembly for mounting on a tube of a vehicle, comprising:
    a clamping portion comprising a concave portion at least partially surroundable the tube of the vehicle and a flange portion at one end of the concave portion;
    a holding support plate including a first side for facing the tube and a second side opposite thereto, the first side configured to be attached to the flange portion of the clamping portion by a fastening means solely operable from the second side of the holding support plate at a position of operability; and
    a housing comprising a cavity for receiving an electronic circuit and a housing lower portion configured to be attached to the second side of the holding support plate,
    wherein the housing overlaps said position of operability, and
    wherein the housing and the holding support plate are configured to be attached to each other by a securing means solely operable at a securing position arranged on an outer surface of the housing.

2. The enclosure assembly of claim 1, wherein the housing or the holding support plate comprise an interlocking connection member configured to interlock the holding support plate with the housing.

3. The enclosure assembly of claim 2, wherein the interlocking connection member is covered by the housing, when the housing is attached to the holding support plate.

4. The enclosure assembly of claim 1, wherein the housing comprises an attachable panel, configured to overlap the securing means when the securing means are in the securing position.

5. The enclosure assembly of claim 1, wherein the fastening means is releasable.

6. The enclosure assembly of claim 2, wherein the interlocking connection member is releasable.

7. The enclosure assembly of claim 1, wherein the securing means is releasable.

8. The enclosure assembly of claim 1,
    wherein the housing comprises a housing cover, wherein the housing lower portion comprises a housing base, and wherein the housing cover and the housing base are attachable to each other for closing the cavity.

9. The enclosure assembly of claim 1, wherein the holding support plate comprises a cable passage extending through the holding support plate from the first side to the second side.

10. The enclosure assembly of claim 1 further comprising an electronic circuit housed in the cavity of the housing.

11. The enclosure assembly of claim 4, further comprising an electronic circuit housed in the cavity of the housing, wherein the attachable panel includes at least one light transmitting portion which is at least partially transparent or translucent such that light from a light emitting diode of the electronic circuit is visible from an outside of the housing.

12. The enclosure assembly of claim 1, wherein the holding support plate further comprises a sound transmission portion letting pass acoustic waves through the holding support plate from the second side to the first side.

13. A method of mounting an enclosure assembly on a tube of a vehicle, comprising:
    providing the enclosure assembly comprising:
        a clamping portion comprising a concave portion for at least partially surrounding the tube and a flange portion at one end of the concave portion;
        a holding support plate including a first side for facing the tube and a second side opposite thereto, the first side configured to be attached to the flange portion of the clamping portion by a fastening means solely operable from the second side of the holding support plate at a position of operability; and
        a housing comprising a cavity for receiving an electronic circuit and a housing lower portion configured to be attached to the second side of the holding support plate,
    arranging the clamping portion and the holding support plate along a circumference of the tube;
    attaching the clamping portion with its flange portion to the holding support plate by the fastening means, the clamping portion and the holding support plate together at least partially surrounding the circumference of the tube;
    attaching the housing to the second side of the holding support plate, wherein the housing overlaps the position of operability; and
    operating the securing means into the securing position to secure the housing to the holding support plate.

14. A vehicle comprising:
    an enclosure assembly, wherein the enclosure assembly is mounted on a tube of the vehicle, comprising:
        a clamping portion comprising a concave portion for at least partially surrounding the tube and a flange portion at one end of the concave portion;
        a holding support plate including a first side for facing the tube and a second side opposite thereto, the first side configured to be attached to the flange portion of the clamping portion by a fastening means solely operable from the second side of the holding support plate at a position of operability; and
        a housing comprising a cavity for receiving an electronic circuit and a housing lower portion configured to be attached to the second side of the holding support plate,
        wherein the housing overlaps said position of operability, and
        wherein the housing and the holding support plate are configured to be attached to each other by a securing means solely operable at a securing position arranged on an outer surface of the housing.

15. The vehicle of claim 14, being an electric scooter.

16. The vehicle of claim 14, wherein the housing or the holding support plate comprise an interlocking connection member configured to interlock the holding support plate with the housing.

17. The vehicle of claim 16, wherein the interlocking connection member is covered by the housing when the housing is attached to the holding support plate.

18. The vehicle of claim 14,
wherein the housing comprises an attachable panel, configured to overlap the securing means when the securing means are in the securing position.

19. The vehicle of claim 14, wherein the fastening means is releasable.

20. The vehicle of claim 16, wherein the interlocking connection member is releasable.

* * * * *